US012033015B2

(12) United States Patent
O'Bryan

(10) Patent No.: US 12,033,015 B2
(45) Date of Patent: Jul. 9, 2024

(54) WIRELESS DESTRUCTIBLE TAGS

(71) Applicant: Roco Plants, Inc., Guanacaste (CR)

(72) Inventor: Dan O'Bryan, Cabra (CR)

(73) Assignee: Roco Plants (CR)

( * ) Notice: Subject to any disclaimer, the term of this patent is extended or adjusted under 35 U.S.C. 154(b) by 0 days.

(21) Appl. No.: 17/683,114

(22) Filed: Feb. 28, 2022

(65) Prior Publication Data

US 2023/0274117 A1 Aug. 31, 2023

(51) Int. Cl.
| | | |
|---|---|---|
| *G06K 19/07* | | (2006.01) |
| *G06K 7/00* | | (2006.01) |
| *G06K 19/077* | | (2006.01) |

(52) U.S. Cl.
CPC ....... *G06K 19/0723* (2013.01); *G06K 7/0008* (2013.01); *G06K 19/0776* (2013.01); *G06K 19/0779* (2013.01)

(58) Field of Classification Search
CPC .......... G06K 19/0723; G06K 7/0008; G06K 19/0776; G06K 19/0779
See application file for complete search history.

(56) References Cited

U.S. PATENT DOCUMENTS

| | | |
|---|---|---|
| D587,691 S | 3/2009 | Oliver |
| D589,828 S | 4/2009 | Dokai et al. |
| D749,442 S | 2/2016 | Jung et al. |
| D803,200 S | 11/2017 | Manivannan |
| D803,201 S | 11/2017 | Manivannan |
| D841,607 S | 2/2019 | Sunagawa |
| 2002/0184857 A1* | 12/2002 | O'Connor ............. B65B 61/182 53/412 |
| 2005/0125363 A1* | 6/2005 | Wilson ..................... G07F 9/026 705/75 |
| 2008/0290176 A1* | 11/2008 | Fleet ................. G06K 19/07749 235/492 |
| 2014/0230324 A1* | 8/2014 | Harooni .................. A01G 9/006 47/65.8 |
| 2014/0292477 A1 | 10/2014 | Ahmadloo |
| 2017/0004741 A1* | 1/2017 | Maltas ..................... G09F 3/206 |
| 2017/0183135 A1* | 6/2017 | Pic ...................... B65D 39/0011 |
| 2018/0129945 A1* | 5/2018 | Saxena ..................... G06N 5/04 |
| 2019/0065920 A1* | 2/2019 | Ennis ................. G06K 19/0776 |
| 2019/0182049 A1* | 6/2019 | Juels ...................... H04L 9/3247 |

(Continued)

FOREIGN PATENT DOCUMENTS

| | | |
|---|---|---|
| EP | 2808840 | 12/2014 |
| EP | 3637392 | 4/2020 |

(Continued)

*Primary Examiner* — Omer S Khan
(74) *Attorney, Agent, or Firm* — Daniel O'Bryan, III; FBFK Law Firm

(57) ABSTRACT

An apparatus implements wireless destructible tags. The apparatus includes a first side with multiple identifiers and a second side with an adhesive. The apparatus further includes a controller with a memory storing a code corresponding to an identifier. The apparatus further includes a proximal end with the controller, a distal end, and an antenna connected to the controller and extending between the proximal end and the distal end. The apparatus further includes a substrate extending between the proximal end and the distal end and with multiple notches to promote tearing the substrate and the antenna.

14 Claims, 9 Drawing Sheets

(56) References Cited

U.S. PATENT DOCUMENTS

2021/0182841 A1* 6/2021 Scott .................... H04L 9/0637
2022/0122026 A1* 4/2022 Okabe ................... G06Q 40/04

FOREIGN PATENT DOCUMENTS

| EP | 3637392 | 5/2021 |
| KR | 101312277 | 10/2013 |
| KR | 101360784 | 2/2014 |
| WO | 2020102669 | 5/2020 |

\* cited by examiner

WIRELESS DESTRUCTIBLE TAGS

BACKGROUND

Tags are used to identify objects. For example, plants may be identified with tags placed on the plants. A challenge is to store data about the tag, the object tagged, the location of the object, etc., and prevent tags from being removed from the object or reused with different objects.

SUMMARY

In general, in one or more aspects, the disclosure relates to an apparatus implementing a wireless destructible tag. The apparatus includes a first side with multiple identifiers and a second side with an adhesive. The apparatus further includes a controller with a memory storing a code corresponding to an identifier. The apparatus further includes a proximal end with the controller, a distal end, and an antenna connected to the controller and extending between the proximal end and the distal end. The apparatus further includes a substrate extending between the proximal end and the distal end and with multiple notches to promote tearing the substrate and the antenna.

In general, in one or more aspects, the disclosure relates to a method implementing a wireless destructible tag. The method includes providing a substrate with: a first side with multiple identifiers, a second side with an adhesive, a proximal end with a controller, and a distal end. The method further includes connecting an antenna to the controller and extending between the proximal end and the distal end, cutting notches into the substrate between the proximal end and the distal end to promote tearing the substrate and the antenna, and storing a code corresponding to an identifier to a memory of the controller.

In general, in one or more aspects, the disclosure relates to a method using a wireless destructible tag. The method includes receiving, by a controller of a tag, a request from a tag communication device to write a value corresponding to hash value of a block of a hash chain. The block includes a payload that includes one or more of genetic data, permit data, location data, tag data, plant data, and environment data. The method further includes storing the value to a memory of the controller and, in response to a request to read the value, transmitting the value.

Other aspects of the invention will be apparent from the following description and the appended claims.

DETAILED DESCRIPTION

Figure 1A:
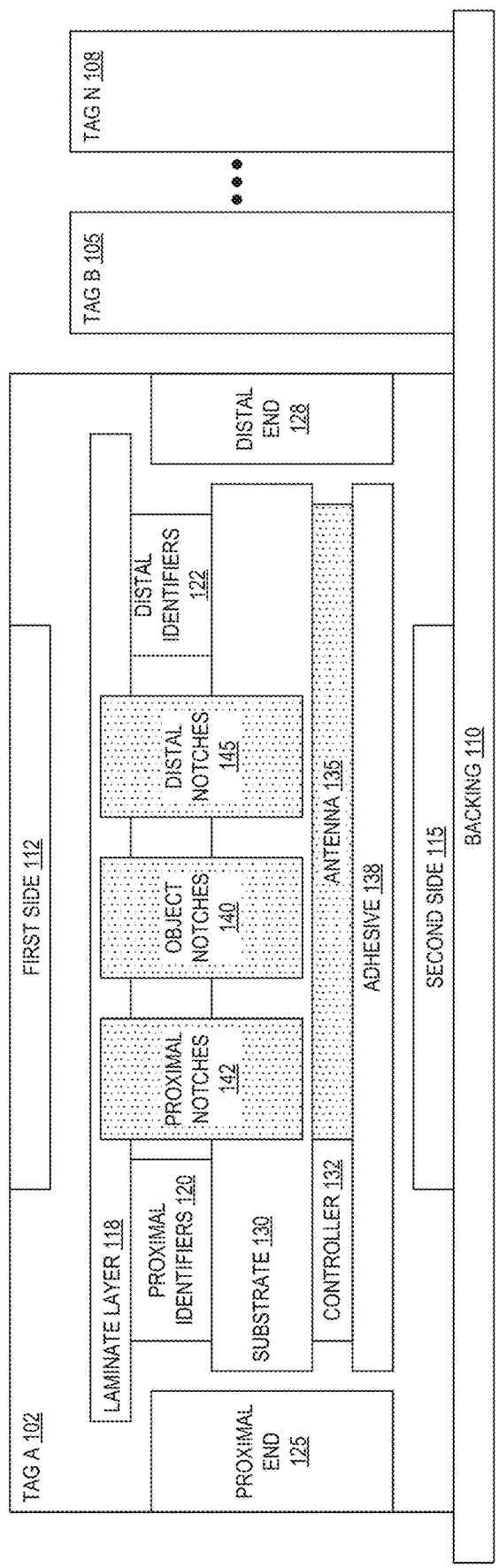
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure store data to tags and prevent the tags from being removed. The tags of the disclosure include a controller and incorporate an antenna into the tag. The antenna is destructible upon attempts to remove the tag. Removing the tag may tear the antenna and alter the transmission and reception capabilities of a controller on the tag. Additionally, the tag may be formed with multiple notches or cuts that promote tearing the antenna but are robust enough to survive typical handling. When the object to which the tag is attached is a plant, the tag is robust enough to survive growth of the plant.

Figure 1B:
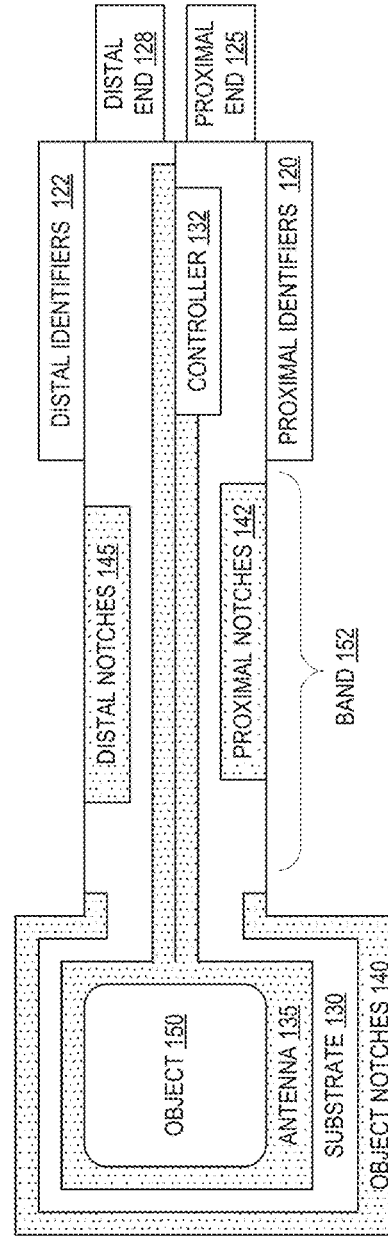
Figure 1C:
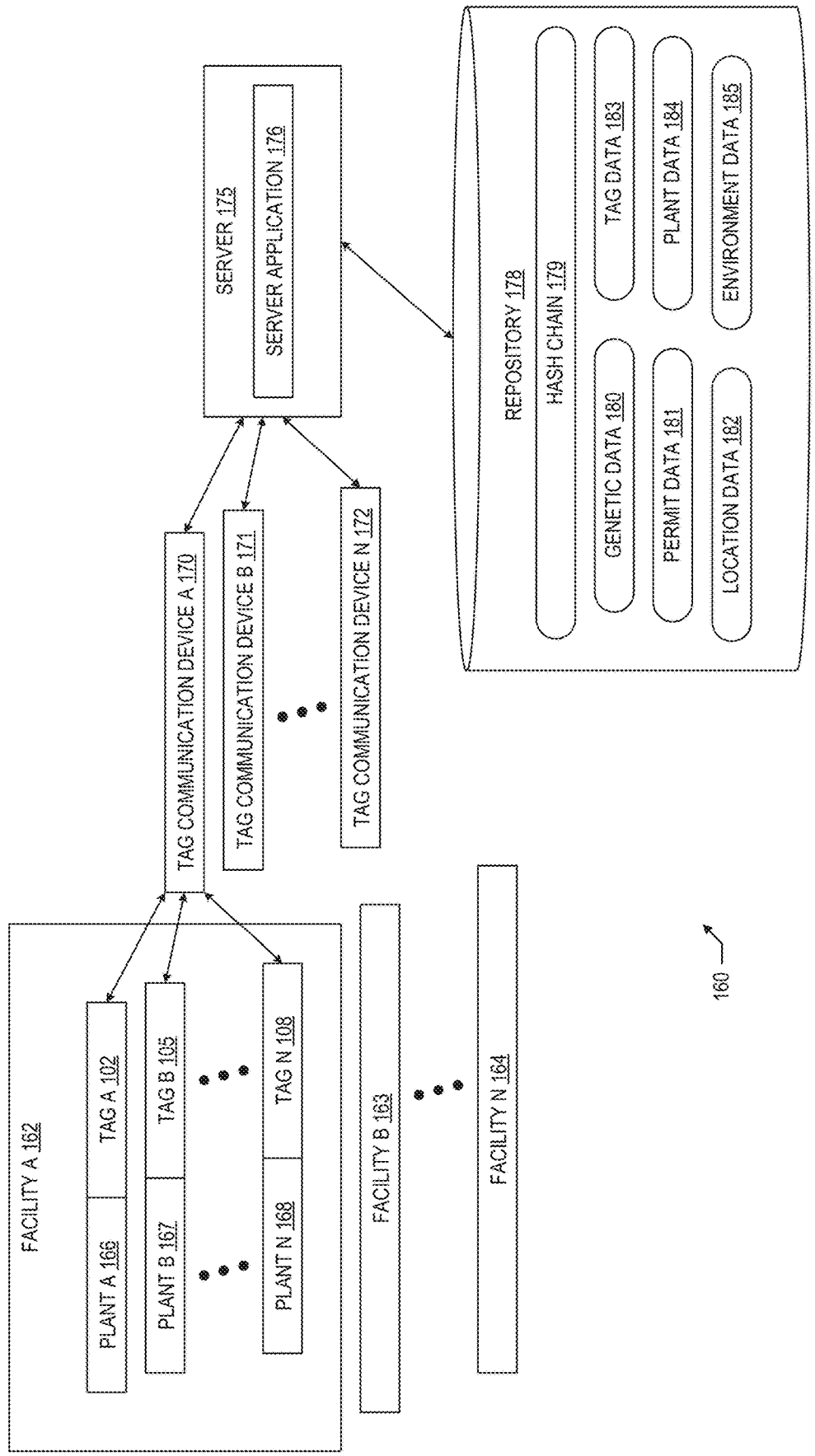
Figure 1D:
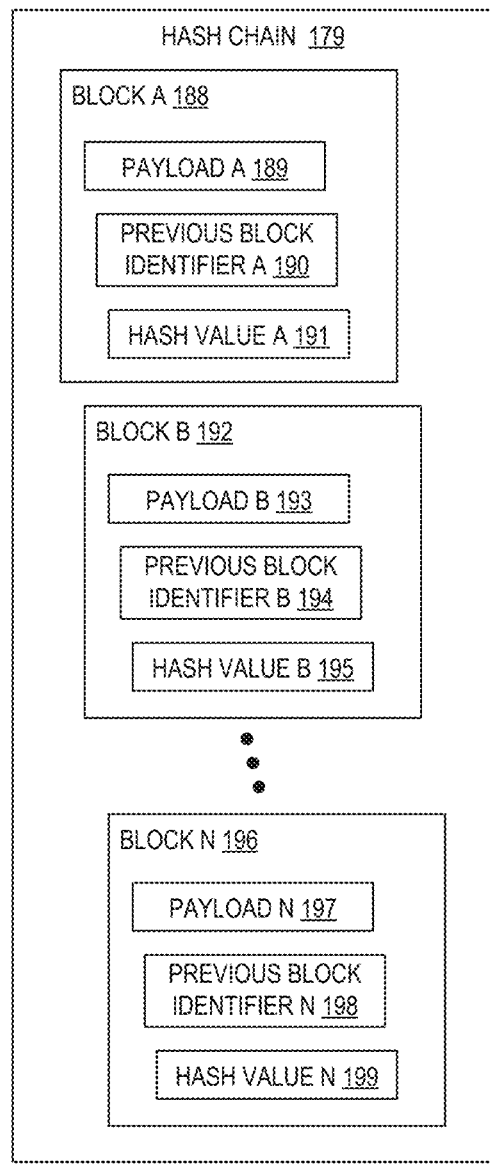

FIGS. 1A, 1B, 1C, and 1D show diagrams of embodiments that are in accordance with the disclosure. FIG. 1A shows a diagram of the tag A (102) prior to being attached to an object. FIG. 1B shows a diagram of the tag A (102) after being attached to the object (150). FIG. 1C shows a diagram of the system (160) that uses the tag A (102). FIG. 1D shows a diagram of the hash chain (179). Embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to tag and object tracking technology and computing systems. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the tags A (102), B (105), and N (108) are similarly formed onto the backing (110). The tag A (102) includes the first side (112), the second side (115), the proximal end (125), and the distal end (128). In one embodiment, the tags A (102), B (105), though N (108) are RFID (radio frequency identification) tags that communicate wirelessly with other computer and communications equipment.

The first side (112) is a side of the tag A (102) onto which the proximal identifiers (120) and the distal identifiers (122) are formed and may be seen. The first side (112) is opposite from the second side (115). The first side (112) may also include the laminate layer (118).

The laminate layer (118) protects the first side (112) of the tag A (102). In one embodiment the laminate layer (118) covers the proximal identifiers (120) and the distal identifiers (122). The laminate layer (118) may be formed from clear plastic with a clear adhesive backing and pressed onto the substrate (130).

The proximal identifiers (120) and the distal identifiers (122) identify information about the tag A (102). The proximal identifiers (120) and the distal identifiers (122) may include codes that identify dates, locations, people, objects, etc. The proximal identifiers (120) and the distal identifiers (122) may use colors, symbols, letters, numbers, images, etc. The proximal identifiers (120) and the distal identifiers (122) may include codes such as bar codes QR (quick response) codes, etc. In one embodiment, the proximal identifiers (120) and the distal identifiers (122) may each include the same identifiers. In one embodiment, the proximal identifiers (120) and the distal identifiers (122) may identify the manufacturer of the tag using an image. In one embodiment, the proximal identifiers (120) and the distal identifiers (122) may identify the date of germination of a plant to which the tag is affixed, the name of a person authorized to use the tag, etc., using a bar code or QR code.

The second side (115) is a side of the tag A (102) that includes the adhesive (138). When used, the tag A (102) is folded over onto itself bringing the proximal end (125) and the distal end (128) of the tag A (102) together, as shown in FIG. 1B.

The proximal end (125) and the distal end (128) are two opposite ends of the tag A (102). The proximal end (125) includes the controller (132), a portion of the antenna (135), and the proximal identifiers (120). The distal end (128) includes a portion of the antenna (135) and the distal identifiers (122).

The substrate (130) provides support to the elements of the tag A (102). The substrate (130) may be made from paper, plastic, etc. In one embodiment, the proximal identifiers (120) and the distal identifiers (122) are on a side of the substrate that is opposite from the side of the controller (132) and the antenna (135).

The controller (132) is a computing system (further described in FIG. 6A) that includes a processor and memory and is connected to the antenna (135). The processor and memory of the controller (132) are configured to store instructions and data that, when executed, cause the controller (132) to receive, transmit, and process information. For example, the controller (132) may receive requests from tag communication devices (see FIG. 1C) to read and write data to the memory of the controller (132). The memory of the controller (132) may include persistent and nonpersistent storage.

The controller (132) stores data that is received and processed by the controller (132) in a memory of the controller. The controller (132) may store data that includes (from FIG. 1C) the genetic data (180), the permit data (181), the location data (182), the tag data (183), the plant data (184), the environment data (185), the hash chain (179), etc. For example, the controller (132) may store a block from the hash chain (179) that includes a payload with updates to the location data (182).

The controller (132) may also include a power storage device. The power storage device may be a battery, a capacitor, etc. In one embodiment, the power storage device wirelessly receives energy from a tag communication device and provides power to the processer to function while the energy is being received from the tag communication device.

The antenna (135) converts energy between electrical signals and electromagnetic radiation and is part of a communication interface of the controller (132). The antenna (135) extends along the substrate (130) from the controller (132) at the proximal end (125) through to the distal end (128). Tampering with the tag A (102) after installation to an object (e.g., a plant) affects the structural integrity of the antenna (135) and, thereby, the transmission and reception properties of the controller (132). In one embodiment, the controller (132) may still be operable to transmit and receive information after the antenna (135) has been torn in a manner that is detectable. In one embodiment, tearing the antenna (135) may cause a memory bit to change, which indicates tampering has occurred. The bit change is evident when interrogating the RFID tag with a reader.

The object notches (140), the proximal notches (142), and the distal notches (145) are formed into the substrate (130) and may be formed into the laminate layer (118). The object notches (140), the proximal notches (142), and the distal notches (145) reduce the lateral integrity of the tag A (102). The object notches (140), the proximal notches (142), and the distal notches (145) weaken the structural integrity of the tag A (102) enough so that tampering with the tag A (102) will be observable. In one embodiment, the object notches (140), the proximal notches (142), and the distal notches (145) are formed by cutting the substrate (130) and the laminate layer (118). The cuts may be through a depth or thickness of the substrate but only partially through a lateral axis of the substrate (130). Embodiments of the tag may include notches placed at various locations, using difference shapes, depths, and dimensions of the tag.

In one embodiment, the object notches (140) are formed in a central portion of the tag A (102) and wrap around a portion of the object to which the tag A (102) is affixed. In one embodiment, the object is the stem of a plant and the object notches (140) are along a portion of the substrate (130) that corresponds to about one third the diameter of the stem of the plant when fully grown.

The length and number of the object notches (140) along the substrate (130), as well as the properties of the adhesive (138), may be determined based on properties of the plant to which the tag A (102) is affixed. For example, plants with thicker stems (e.g., greater than about one inch) may have more notches along the substrate (130) with a relatively weaker adhesive as compared to plants with thinner stems (e.g., less than about one inch). The weaker adhesive (138) allows the plant to grow inside of the tag A (102) without destroying the tag A (102).

The adhesive (138) keeps the proximal end (125) and the distal end (128) together after the tag A (102) is folded onto itself around an object. The adhesive (138) may also keep a central portion of the tag A (102) secured to an object. The adhesive (138) may be on the same side of the substrate (130) as the controller (132) and the antenna (135).

The backing (110) supports the tags A (102), B (105), and C (108). In one embodiment, the backing (110) is formed with wax paper to hold the tags A (102), B (105), and C (108) until being pulled off from the backing (110).

Turning to FIG. 1B, the tag A (102) is shown after being installed to the object (150). In one embodiment, the object (150) is the stem of a plant.

The substrate (130) and the antenna (135) of the tag A (102) are folded over and wrapped around the object (150) to bring the distal end (128) and the proximal end (125) together. In one embodiment, the substrate (130) is pressed together from the distal and proximal ends (128) and (125) towards the object (150) to form the band (152). The controller is juxtaposed with the antenna between the distal and proximal ends (128) and (125) of the substrate (130).

The band (152) is a portion of the tag A (102) that extends between the object (150) and the distal and proximal ends (128) and (125). The band (152) includes the distal notches (145) and the proximal notches (142). In one embodiment, the object (150) is a plant and 3 to 4 months may elapse, depending on the type of plant, for an effect on the band due to plant growth. The length of the band (152) may be preselected based on the type of plant and the length of time the tag A (102) will be attached to the plant.

The distal notches (145) and the proximal notches (142) are substantially aligned on opposite faces of the tag A (102) after being folded. The distal notches (145) and the proximal notches (142) promote easily tearing the combined ends (128) and (125) with the distal and proximal identifiers (122) and (120) and the controller (132) off from the tag A (102).

Turning to FIG. 1C, the system (160) objects (including the plants A (166), B (167), through N (168)) at the facilities A (162), B (163), through N (164) are tracked using the tag communication devices A (170), B (171), through N (172), and the server (175). Information about the objects being tracked is stored in the repository (178).

The facilities A (162), B (163), through N (164) are physical locations and buildings where the objects being tracked are stored. The facilities A (162), B (163), through N (164) may include indoor facilities and outdoor facilities. In one embodiment, the objects being tracked include plants and the facilities A (162), B (163), through N (164) may include green houses, outdoor fields, farms, etc.

The plants A (166), B (167), through N (168) are the objects begin tracked by the system (160). The different plants A (166), B (167), through N (168) may be of the same species. Each of the plants A (166), B (167), through N (168) may have their genetic code stored in the genetic data (180) of the repository (178).

The tags A (102), B (105), through N (108) are attached to the plants A (166), B (167), through N (168). The controllers of the tags A (102), B (105), through N (108) communicate with the tag communication devices A (170), B (171), through N (172). In one embodiment, the tag communication device A (170) is used to retrieve and store data in the tags A (102), B (105), through N (108) at the facility A (162).

The tag communication devices A (170), B (171), through N (172) communicate with the tags (including the tags A (102), B (105), through N (108)) stored in the facilities A (162), B (163), through N (164). Each of the tag communication devices A (170), B (171), through N (172) may be used at one or multiple facilities. In one embodiment, tag communication devices A (170), B (171), through N (172) are RFID reader writers that may read from and write to the tags A (102), B (105), through N (108). The tag communication devices A (170), B (171), through N (172) are computing systems, as described in FIGS. 6A and 6B.

Figure 6A:
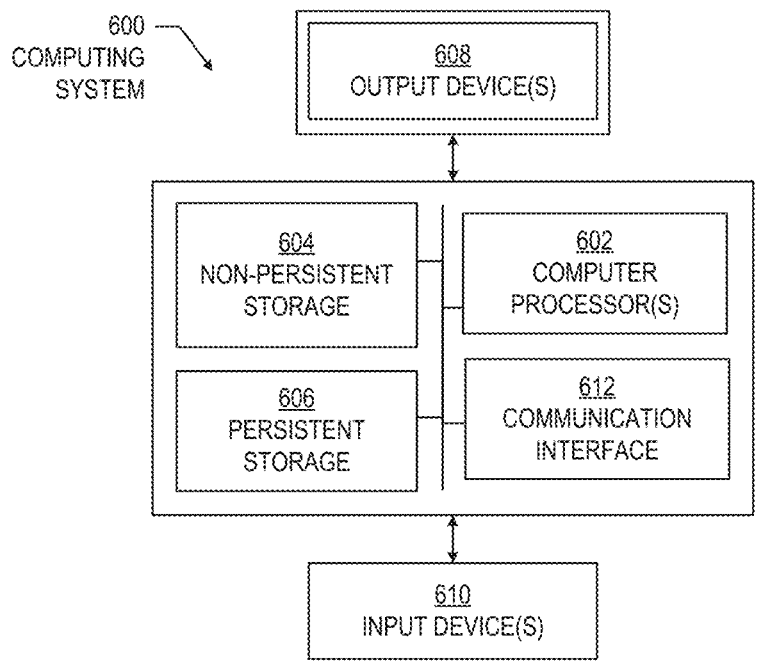
FIG. 6A and FIG. 6B show computing systems in accordance with disclosed embodiments.

The server (175) is a computing system (further described in FIG. 6A). The server (175) may include multiple physical and virtual computing systems that form part of a cloud computing environment. In one embodiment, execution of the programs and applications of the server (175) is distributed to multiple physical and virtual computing systems in the cloud computing environment. The server (175) includes the server application (176).

The server application (176) is a collection of programs that may execute on multiple servers of a cloud environment, including the server (175). In one embodiment, the server application (176) hosts websites and provides services for tracking objects, including the plants A (166), B (167), through N (168). The server application (176) receives, processes, and transmits data and information to and from the tags A (102), B (105), through N (108). The data an information is stored in the repository (178).

The repository (178) is a computing system that may include multiple computing devices in accordance with the computing system (500) and the nodes (522) and (524) described below in FIGS. 6A and 6B. The repository (178) may be hosted by a cloud services provider that also hosts the server (175). The cloud services provider may provide hosting, virtualization, and data storage services as well as other cloud services and to operate and control the data, programs, and applications that store and retrieve data from the repository (178). The data in the repository (178) includes the hash chain (179), the genetic data (180), the permit data (181), the location data (182), the tag data (183), the plant data (184), and the environment data (185).

The hash chain (179) stores at least a portion of the data in the repository (178) in an immutable sequence. Data (which may include the genetic data (180), the permit data (181), the location data (182), the tag data (183), the plant data (184), the environment data (185), etc.) is stored in the payloads of an immutable sequence of blocks with the hash chain (179), which is further described with FIG. 1D.

The genetic data (180) is data about the genetics of the objects that are tagged. In one embodiment, the objects include the plants A (166), B (167), through N (168) and the genetic data (180) includes the genome sequences for each of the plants A (166), B (167), through N (168).

The permit data (181) is data about the permits for the objects that are tagged. In one embodiment, the objects include the plants A (166), B (167), through N (168) and the permit data (181) identifies the permits under which the plants A (166), B (167), through N (168) are grown. The permit data (181) may identify the owner of the permit, the permitted locations for growth, the permitted dates of growth, contact information for the owner of the permit, etc.

The location data (182) is data about the location of the objects that are tagged. In one embodiment, the objects include the plants A (166), B (167), through N (168) and the location data (182) identifies the locations of the plants A (166), B (167), through N (168). The location data (182) may include coordinates for longitude, latitude, altitude, etc., as well as street addresses.

The tag data (183) is data about the tags (including the tags A (102), B (105), through N (108)) of the system (160). In one embodiment, the tag data (183) includes a unique identifier for each of the tags A (102), B (105), through N (108). The tag data (183) may also include a complete copy of the data stored in the memory of the tag data (183).

The plant data (184) is data about the plants A (166), B (167), through N (168). The plant data (184) may include taxonomy data, which may identify the types and species of the plants A (166), B (167), through N (168). In one embodiment, the plant data (184) is object data that includes a unique database for each of the objects (including the plants A (166), B (167), through N (168)) that are tagged by the system (160). The object databases for the plants A (166), B (167), through N (168) may track and record changes to the data for the plants A (166), B (167), through N (168) during the life cycle of the plants A (166), B (167), through N (168).

The environment data (185) is data about the environment of the objects that are tagged. In one embodiment, the objects include the plants A (166), B (167), through N (168)

and the environment data (185) may include data describing the environment, including temperature, pressure, humidity, soil nutrients, etc.

Turning to FIG. 1D, the hash chain (179) stores data in the payloads A (189), B (193), through N (197) of the blocks A (188), B (192), through N (196). The hash chain (179) is stored in the repository (178) (of FIG. 1C) and copies of the data of the hash chain (179) may be stored by the controllers of the tags A (102), B (105), through N (108) (of FIG. 1C). In one embodiment, the blocks A (188), B (192), through N (196) or the hash values A (191), B (195), through N (199) may be stored in the tags A (102), B (105), through N (108) (of FIG. 1C). The blocks A (188), B (192), through N (196) respectively include the payloads A (189), B (193), through N (197), the previous block identifiers A (190), B (194), through N (198), and the hash values A (191), B (195), through N (199).

The payloads A (189), B (193), through N (197) of the blocks A (188), B (192), through N (196) store data in the hash chain (179). Each of the payloads A (189), B (193), through N (197) may include new data or data that has been updated. For example, the payload A (189) may store the location data (182) (of FIG. 1C) that identifies location coordinates for the plant A (166) (of FIG. 1C) when the tag A (102) (of FIG. 1C) is read by the tag communication device A (170) (of FIG. 1C). The payload B (193) may store updates to the location data (182) (of FIG. 1C) after the tag A (102) (of FIG. 1C) is subsequently read by the tag communication device A (170) (of FIG. 1C). The payloads A (189), B (193), through N (197) may include the genetic data (180), the permit data (181), the location data (182), the tag data (183), the plant data (184), the environment data (185), etc.

The previous block identifiers A (190), B (194), through N (198) of the blocks A (188), B (192), through N (196) respectively identify the previous blocks. For example, the previous block identifier B (193) of the block B (192) may identify the block A (188) as the previous block to the block B (192).

In one embodiment, the previous block may be identified by the hash value of the previous block. For example, the previous block identifier B (194) (of the block B (192)) may be the hash value A (191) (of the block A (188)).

The hash values A (191), B (195), through N (199) are unique values that correspond and may identify the blocks A (188), B (192), through N (196). The hash values A (191), B (195), through N (199) are generated by hashing the payloads A (189), B (193), through N (197) with the previous block identifiers A (190), B (194), through N (198) using a cryptographic hashing function. Cryptographic hashing functions include the SHA family of cryptographic hash functions (SHA-1, SHA-256, SHA-3, etc.), the BLAKE family of cryptographic hash functions (BLAKE2, BLAKE-256, BLAKE3, etc.), the MD family of cryptographic hash functions (MD2, MD5, MD6, etc.), etc.

The blocks A (188), B (192), through N (196) store data in an immutable sequence. Changing data in one of the bocks after subsequent blocks have been written to the hash chain (179) would invalidate the block in which the data is changed as well as the subsequent blocks. Blocks are validated by recalculating the hash values of the blocks. If a recalculated hash value does not match the previously recorded hash value, then the block is invalidated, which is an indication that either the payload data has changed, or the previously recorded hash value has changed.

As an example, the hash value B (195) may be generated by hashing the payload B (193) and the previous block identifier B (194) (which identifies the block A (188) as the previous block) with a cryptographic hash function. If the data in the payload B (193) is subsequently changed, then the hash value B (195) can no longer by validated by subsequently recalculating the hash value. Additionally, all of the subsequent blocks may be invalidated.

Figure 2A:
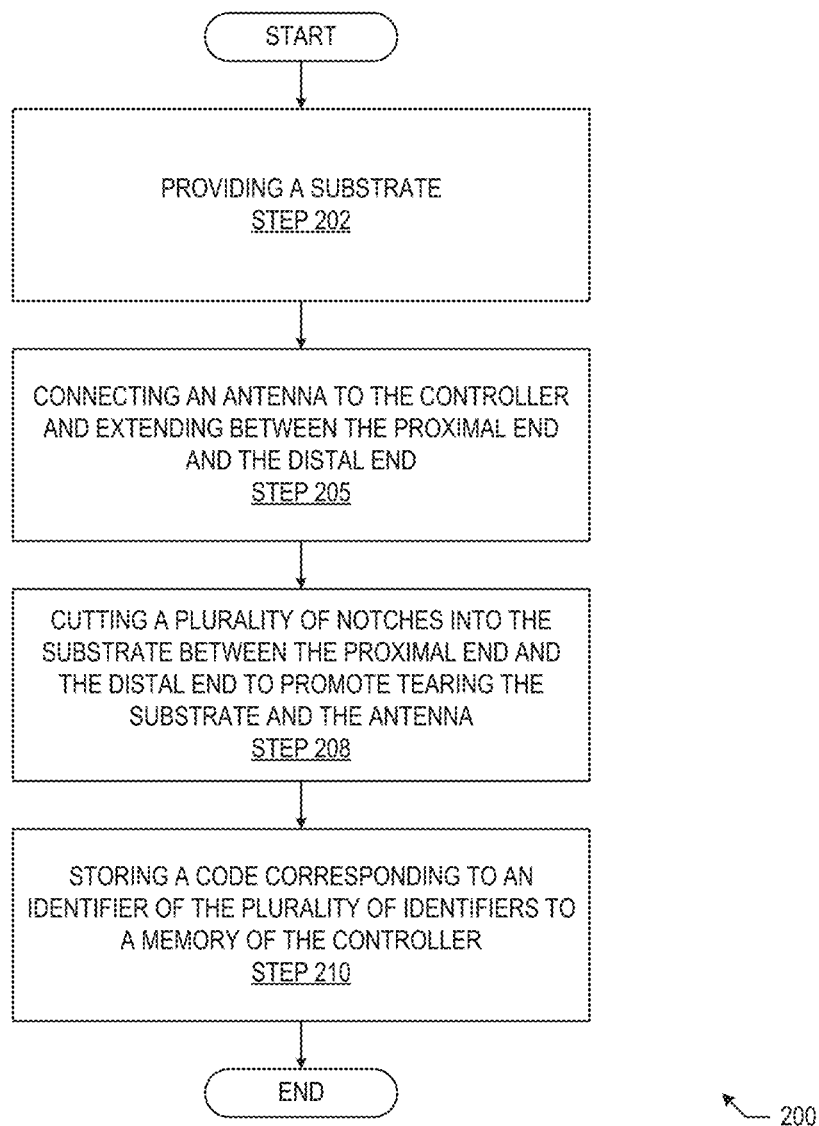
FIG. 2A and FIG. 2B show a flowchart in accordance with disclosed embodiments.
Figure 2B:
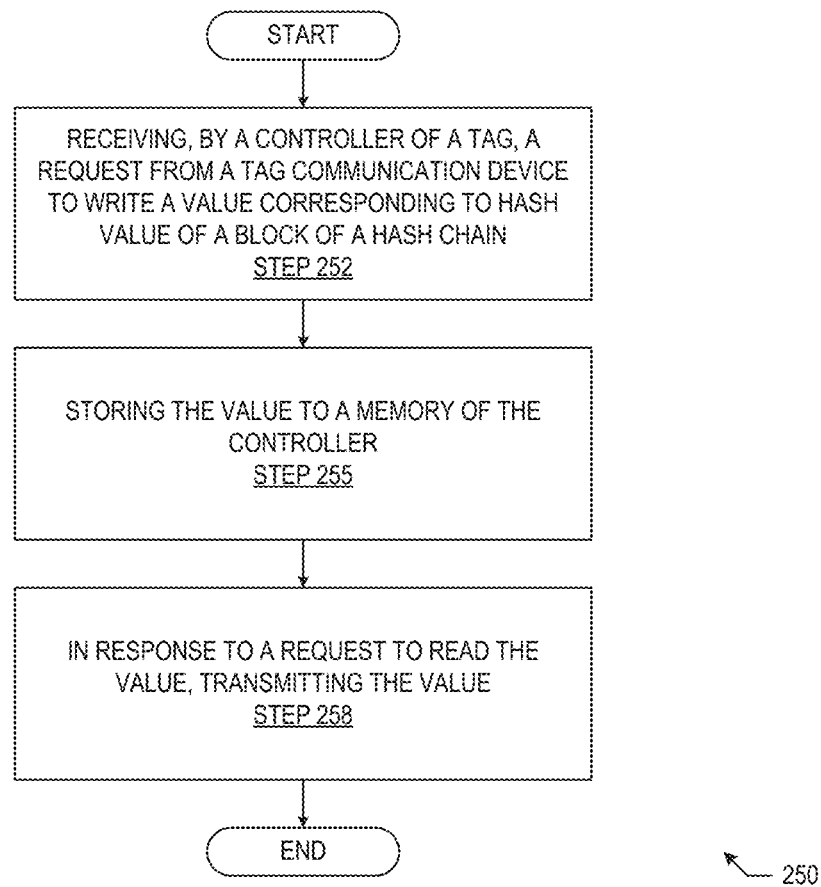

FIGS. 2A and 2B show flowcharts of processes in accordance with the disclosure. FIG. 2A illustrates the process (200) of manufacturing a tag. FIG. 2B illustrates the process (250) of communicating with a tag. The embodiments of FIGS. 2A and 2B may be combined and may include or be included within the features and embodiments described in the other figures of the application. The features of FIGS. 2A and 2B are, individually and as an ordered combination, improvements to tag and object tracking technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2A, the process (200) manufactures a tag. The tag may be attached to an object and used to track the object.

At Step 202, a substrate is provided. The substrate comprises a first side with one or more identifiers, a second side with an adhesive, a proximal end with a controller, and a distal end opposite the proximal end.

At Step 205, an antenna is connected to a controller and extends between the proximal end and the distal end. The antenna is made from aluminum and is a destructible antenna.

At Step 208, notches are cut into the substrate between the proximal end and the distal end to promote tearing the substrate and the antenna. Damage to the antenna changes the reception and transmission characteristics of the controller. In one embodiment, the notches include rectangular cutouts.

At Step 210, a code corresponding to the one or more identifiers is stored to a memory of the controller. The code may include a hash value from a hash chain, a block from the hash chain, data from a payload of a block of the hash chain, etc.

Turning to FIG. 2B, the process (250) may be performed by the controller of a tag. The process (250) may be used to track an object.

At Step 252, a request from a tag communication device is received, by a controller of a tag, to write a value corresponding to hash value of a block of a hash chain. The block includes a payload that includes one or more of genetic data, permit data, location data, tag data, plant data, environment data, etc. In one embodiment, the value is computed by the tag in response to the write request from the tag communication device. In one embodiment, the read request may include location data that is hashed by the tag and stored to the tag. Additional data may be used to generate the value using a cryptographic hash function. The additional data may include a previous hash value, a unique identifier for the tag, genetic data, permit data, location data, tag data, plant data, environment data, etc. In one embodiment the value may be generated by a computing system other than the controller of the tag.

At Step 255, the value is stored to a memory of the controller. In one embodiment, the value may overwrite a preexisting value in the memory of the controller. In one embodiment a preexisting hash value is overwritten with the value.

At Step 258, in response to a request from a tag communication device to read the value, the value is transmitted. In one embodiment, the request to write the value and the request to read the value are the same request. For example, the request is sent to the tag, the tag writes the value, and then the tag transmits the value back to the tag communication device. In one embodiment, the write request and the read request are separate requests. For example, a first tag communication device transmits the write request, and a different tag communication device may subsequently transmit the read request.

Figure 3A:
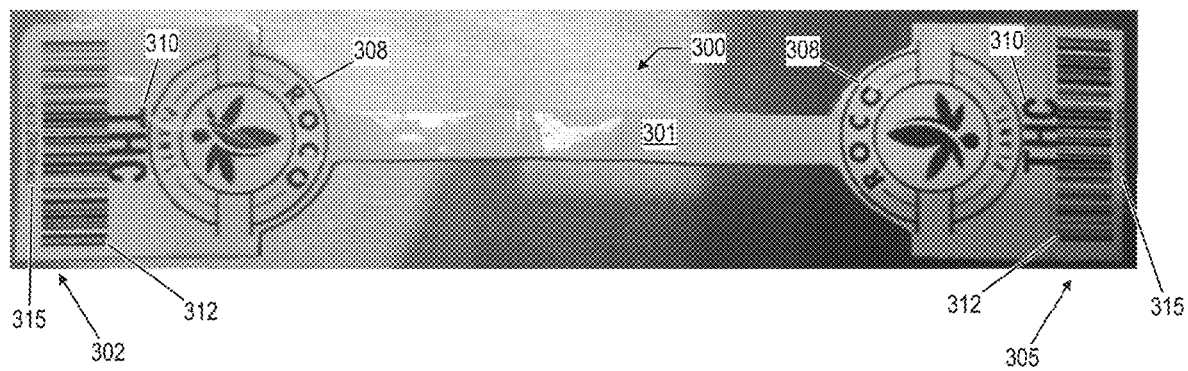
FIG. 3A, FIG. 3B, FIG. 3C, FIG. 4A, FIG. 4B, FIG. 5A, and
FIG. 5B show examples in accordance with disclosed embodiments.
Figure 3B:
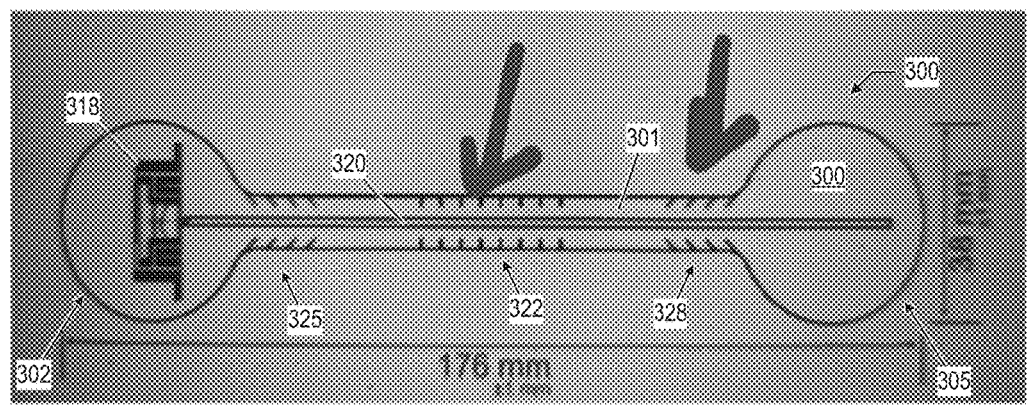
Figure 3C:
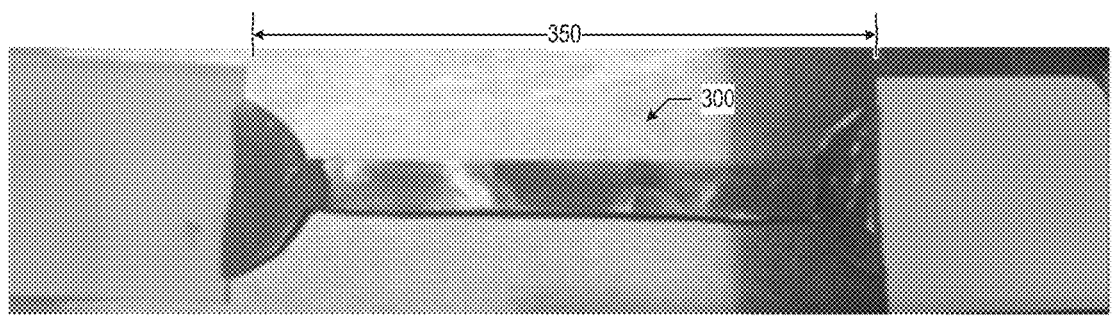
Figure 4A:
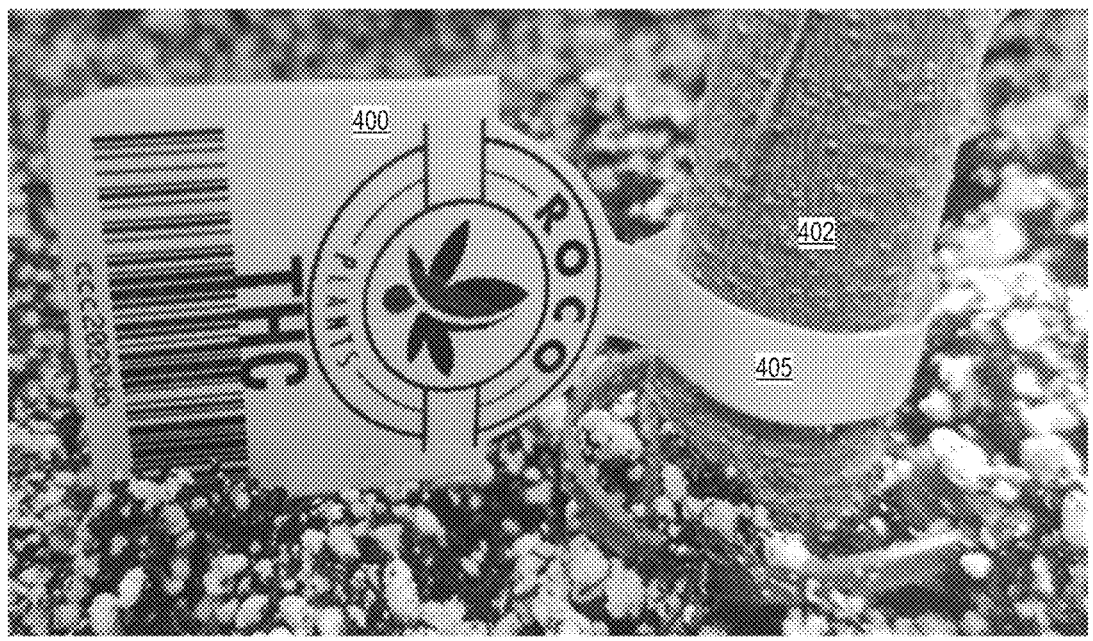
Figure 4B:
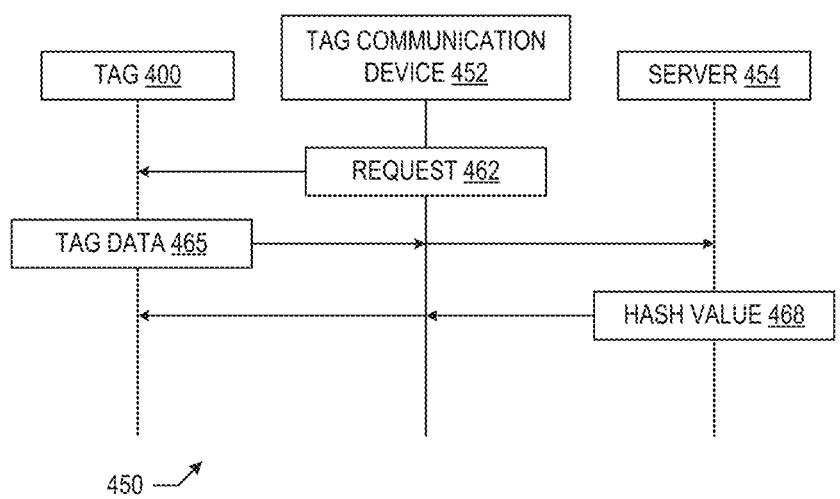

FIGS. 3A-3C and 4A-4B show examples in accordance with the disclosure. FIGS. 3A-3C shows views of tags. FIG. 4A shows the tag (400) installed. FIG. 4B shows the sequence (450) for communicating with the tag (400). The embodiments shown in FIGS. 3A-3C and 4A-4B may be combined and may include or be included within the features and embodiments described in the other figures of the application. The features and elements of FIGS. 3A-3C and 4A-4B are, individually and as a combination, improvements to tag and object tracking technology and computing systems. The various features, elements, widgets, components, and interfaces shown in FIGS. 3A-3C and 4A-4B may be omitted, repeated, combined, and/or altered as shown. Accordingly, the scope of the present disclosure should not be considered limited to the specific arrangements shown in FIGS. 3A-3C and 4A-4B.

Turning to FIG. 3A, a view of a tag prior to installation is shown from a first side. The tag (300) includes the band (301), which forms a loop around the object to which the tag (300) is attached. The tag (300) includes the proximal end (302) and the distal end (305). The proximal end (302) and the distal end (305) include the same set of identifiers. The set of identifiers includes the image (308), the plant identifier (310) ("THC"), the machine-readable identifier (312) (a barcode), and the human-readable identifier (315) ("ccc2020do").

The image (308) includes a symbol that identifies an entity corresponding to the object being tracked (a plant). For example, the entity may be the grower of the plant, the owner of the facility where the plant is grown, the manufacturer of the tag, etc.

The plant identifier (310) ("THC") identifies the type of plant to which the tag is attached. The type of plant may be used to limit the number of plants that may be tagged and tracked.

The machine-readable identifier (312) is a barcode that corresponds to the human-readable identifier (315) ("ccc2020do"). The machine-readable identifier (312) and the human-readable identifier (315) may include multiple codes. For example, the code "ccc" maps to the location where the plant to which the tag (300) is attached may be stored, the code "2020" identifies when the plant was germinated, and the code "do" may identify the entity (person or organization) that is permitted to grow the plant.

Turning to FIG. 3B, a view of the tag (300) is shown from a second side. The proximal end (302) includes the controller (318). The controller is connected to the antenna (320). The antenna (320) extends from the proximal end (302) along the length of the tag (300) to the distal end (305). In one embodiment, the length of the tag (300) from the proximal end (302) to the distal end (305) is about 176 millimeters and the width of the tag (300) is about 38 millimeters.

The tag (300) includes the object notches (322), the proximal notches (325), and the distal notches (328). The object notches (322), the proximal notches (325), and the distal notches (328) are cuts through the substrate (330) of the tag (300) to promote tearing the tag (300) and the destructibility of the antenna (320). The object notches (322) promote tearing the tag (300) off from the object to which the tag (300) is attached (along with damaging the antenna (320)). The proximal notches (325) and the distal notches (328) promote tearing the proximal and distal ends (302) and (305) off from the tag (300) (along with damaging the antenna (320)) to leave the loop formed by the band (301) attached to the object to which the tag (300) is attached. The placement, shape, depth, and dimensions to the notches in the tags may differ from what is shown depending on the use, type of plant, user preference, and experimentation.

Turning to FIG. 3C, the second side of the tag (300) is shown prior to installation of a controller or antenna to the tag (300). The portion (350) of the second side of the tag includes a color changing adhesive. An attempt to remove the tag (300) after installation to an object causes the color of the adhesive in the portion (350) to change. In one embodiment, the adhesive changes from clear or colorless to a red coloring.

Turning to FIG. 4A, the tag (400) is installed to an object, the plant (402). The distal end of the first side of the tag (400) can be seen with a set of identifiers (as described in FIG. 3A). The tag (400) includes the band (405) that forms a loop around a stem of the plant (402).

Turning to FIG. 4B, the sequence (450) communicates data between the tag (400) and the server (454). The sequence (450) is performed by the tag (400), the tag communication device (452), and the server (454).

The request (462) is sent from the tag communication device (452) to the tag (400). The request (462) may be a read request to read information from the tag (400).

The tag data (465) is transmitted from the tag (400) and received by the tag communication device (452), which retransmits the tag data (465) to the server (454). The server (454) may store and process the tag data (465). The tag data (465) may include one or more of genetic data, permit data, location data, plant data, environment data, etc. In one embodiment, the tag data (465) includes a unique identifier for the tag (400). In one embodiment, the tag communication device (452) includes location data when retransmitting the tag data (465) to the server (454).

The hash value (468) is generated by the server (454) and transmitted to the tag communication device (452), which retransmits the hash value (468) to the tag (400). The hash value (468) is generated using a cryptographic hash function using the tag data (465) and may also use data from the tag communication device (452) (e.g., location data). The hash value (468) is stored by the tag (400) to a memory of a controller of the tag (400).

Figure 5A:
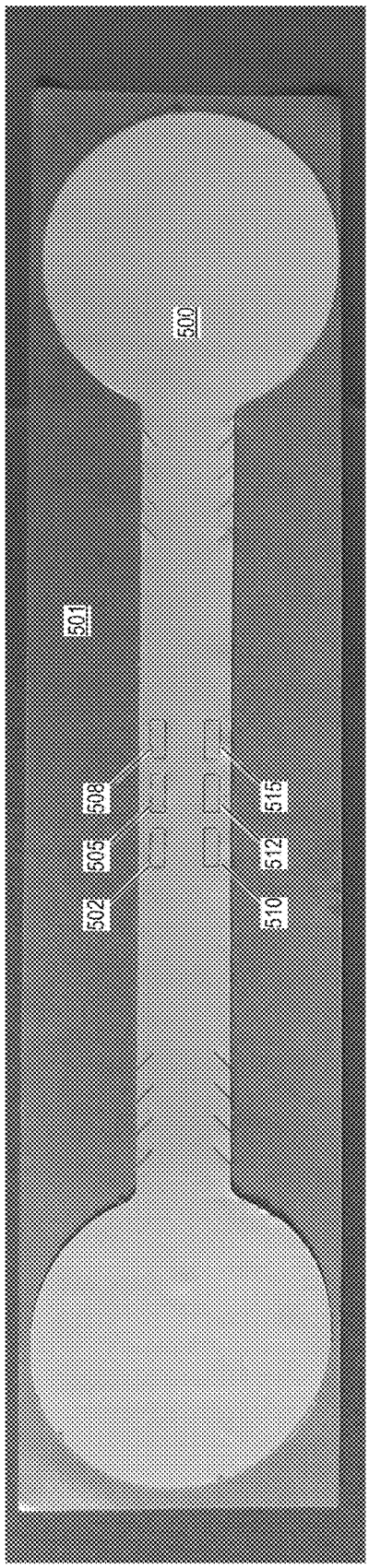

Turning to FIG. 5A, the tag 500 includes multiple notches. The placement, shape, depth, and dimensions to the notches in the tag may differ from what is shown depending on the use, type of plant, user preference, and experimentation. The object notches for the stem are formed as the rectangular cutouts 502, 505, 508, 510, 512, and 515. The rectangular cutouts 502 through 515 thwart tampering and re-use of the tag 500 after the tag 500 has been installed to a plant. The rectangular cutouts 502, 505, 508, 510, 512, and 515 remain connected with the tag 500 when the tag 500 is removed from the backing 501. After installation to an object (e.g., a plant). The interior portion of the rectangular cutouts 502, 505, 508, 510, 512, and 515 may remain stuck to the object and rip the tag 500.

Figure 5B:
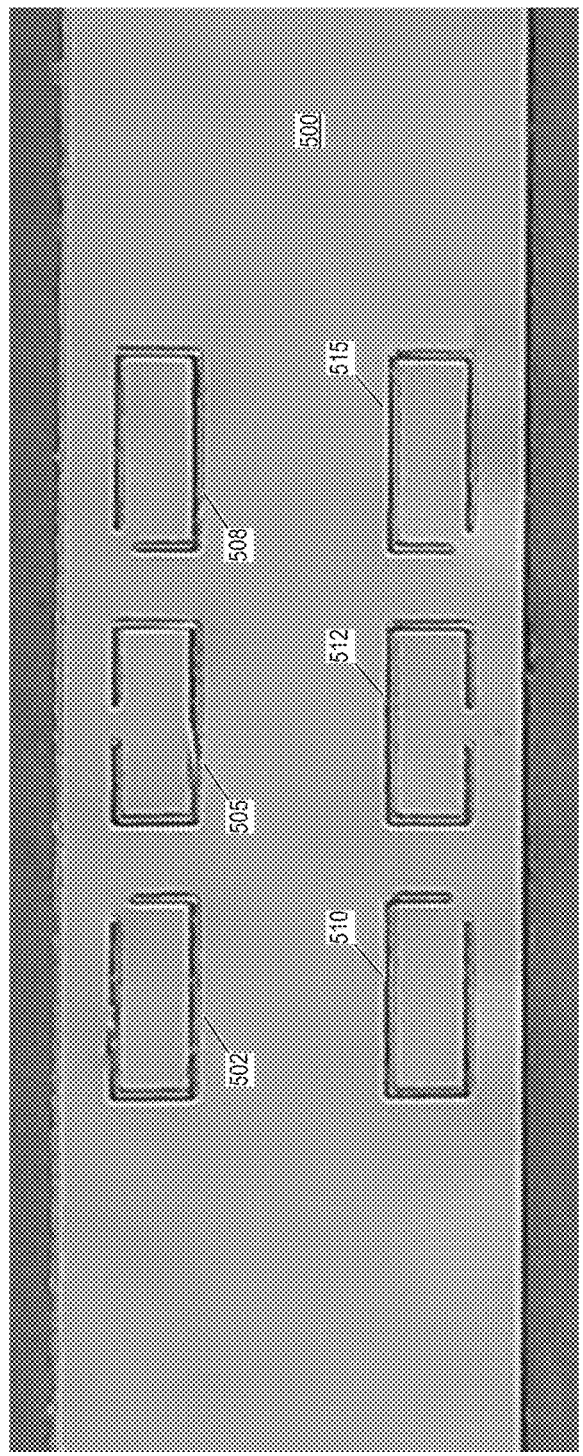

Turning to FIG. 5B, the rectangular cutouts 502 through 515 of the tag 500 are implemented using rectangles with different cuts to connect the interior rectangular portion of the tag 500 to the rest of the tag 500. The rectangular cutouts 502, 508, 510, and 515 have gaps at different corners to connect the interior rectangular portion of the tag 500 (corresponding to the rectangular cutouts 502, 508, 510, and 515) to the rest of the tag 500. The rectangular cutouts 505 and 512 have gaps on different sides to connect the interior rectangular portion of the tag 500 (corresponding to the rectangular cutouts 505 and 512) to the rest of the tag 500.

Embodiments of the invention may be implemented on a computing system. Any combination of a mobile, a desktop, a server, a router, a switch, an embedded device, or other types of hardware may be used. For example, as shown in FIG. 6A, the computing system (600) may include one or more computer processor(s) (602), non-persistent storage (604) (e.g., volatile memory, such as a random access memory (RAM), cache memory), persistent storage (606) (e.g., a hard disk, an optical drive such as a compact disk (CD) drive or a digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) (602) may be one or more cores or micro-cores of a processor. The computing system (600) may also include one or more input device(s) (610), such as a touchscreen, a keyboard, a mouse, a microphone, a touchpad, an electronic pen, or any other type of input device.

The communication interface (612) may include an integrated circuit for connecting the computing system (600) to a network (not shown) (e.g., a local area network (LAN), a wide area network (WAN) such as the Internet, a mobile network, or any other type of network) and/or to another device, such as another computing device.

Further, the computing system (600) may include one or more output device(s) (608), such as a screen (e.g., a liquid crystal display (LCD), a plasma display, a touchscreen, a cathode ray tube (CRT) monitor, a projector, or other display device), a printer, an external storage, or any other output device. One or more of the output device(s) (608) may be the same or different from the input device(s) (610). The input and output device(s) (610 and (608)) may be locally or remotely connected to the computer processor(s) (602), non-persistent storage (604), and persistent storage (606). Many different types of computing systems exist, and the aforementioned input and output device(s) (610 and (608)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system (600) shown in FIG. 6A, or a group of nodes combined may correspond to the computing system (600) shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Figure 6B:
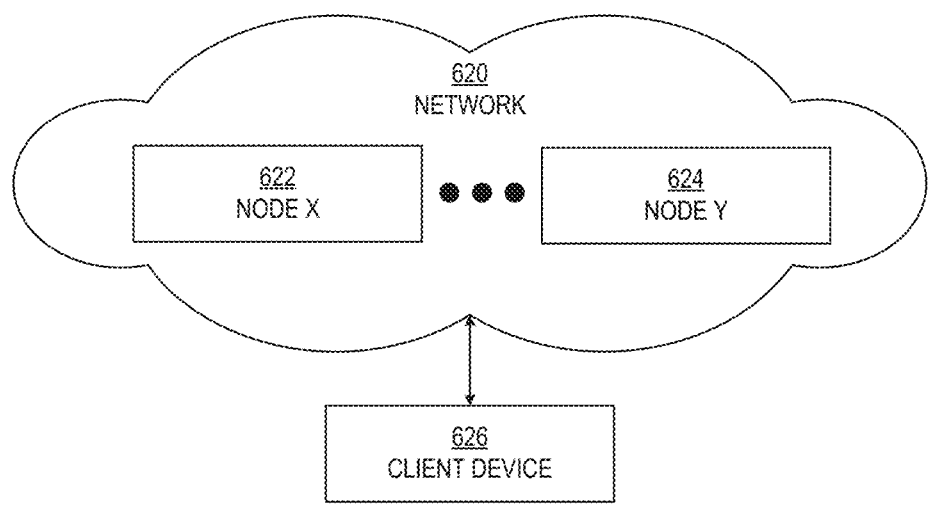

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system (600) shown in FIG. 6A. Further, the client device (626) may include and/or perform all or a portion of one or more embodiments of the invention.

The computing system (600) or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready.

An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (600) of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (600) of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (600) of FIG. 6A and the nodes (e.g., node X (622), node Y (624)) and/or client device (626) in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus forming a tag, the apparatus comprising:
a first side comprising a plurality of identifiers;
a second side comprising an adhesive;
a controller comprising a memory storing:
    a code corresponding to an identifier of the plurality of identifiers, plant data and one or more of genetic data, permit data, location data, tag data, and environment data; and
    a hash value generated from a payload of a block and a previous block identifier, wherein the payload of the block includes the plant data;
a proximal end comprising the controller;
a distal end;
an antenna connected to the controller and extending between the proximal end and the distal end; and
a substrate extending between the proximal end and the distal end and comprising a plurality of notches to promote tearing the substrate and the antenna; and
a plurality of object notches of the plurality of notches, wherein the plurality of object notches is structured to wrap around a stem of a plant to which the tag is affixed.

2. The apparatus of claim 1,
wherein the plurality of notches promote tearing the antenna, and
wherein the plurality of notches reduces a lateral integrity of the substrate.

3. The apparatus of claim 1, further comprising the memory of the controller comprising:
a block of a hash chain.

4. The apparatus of claim 1, wherein the adhesive comprises a color changing adhesive.

5. The apparatus of claim 1, wherein the substrate and the antenna are structured to wrap around the stem of the plant and bringing the distal end to the proximal end.

6. The apparatus of claim 1, further comprising:
a plurality of distal notches of the plurality of notches; and
a plurality of proximal notches of the plurality of notches, wherein the plurality of distal notches and the plurality of proximal notches are structured to be aligned after the substrate is wrapped around the stem of the plant.

7. The apparatus of claim 1, further comprising:
a plurality of stem notches of the plurality of notches, wherein the plurality of stem notches is structured to wrap around the stem of the plant.

8. The apparatus of claim 1, further comprising:
the plurality of notches comprising a plurality of rectangular cutouts.

9. The apparatus of claim 1, further comprising:
a plurality of distal notches of the plurality of notches at an angular offset with respect to a longitudinal axis of the substrate; and
a plurality of proximal notches of the plurality of notches at a reflected angular offset with respect to the longitudinal axis of the substrate.

10. The apparatus of claim 1, further comprising:
a plurality of stem notches perpendicular to a longitudinal axis of the substrate.

11. A method comprising:
providing a substrate of a tag, wherein the substrate comprises:
  a first side comprising a plurality of identifiers,
  a second side comprising an adhesive,
  a proximal end comprising a controller, and
  a distal end;
connecting an antenna to the controller and extending between the proximal end and the distal end;
cutting a plurality of notches into the substrate between the proximal end and the distal end to promote tearing the substrate and the antenna, wherein the plurality of notches comprise a plurality of object notches structured to wrap around a stem of a plant to which the tag is affixed; and
storing a code corresponding to an identifier of the plurality of identifiers, plant data and one or more of genetic data, permit data, location data, tag data, plant data, and environment data to a memory of the controller; and
storing a hash value generated from a payload of a block and a previous block identifier to the memory of the controller, wherein the payload of the block includes the plant data.

12. The method of claim 11,
wherein the plurality of notches promote tearing the antenna, and
wherein the plurality of notches reduces a lateral integrity of the substrate.

13. The method of claim 11, further comprising:
storing a block of a hash chain to the memory of the controller.

14. The method of claim 11, wherein the adhesive comprises a color changing adhesive.

* * * * *